UNITED STATES PATENT OFFICE.

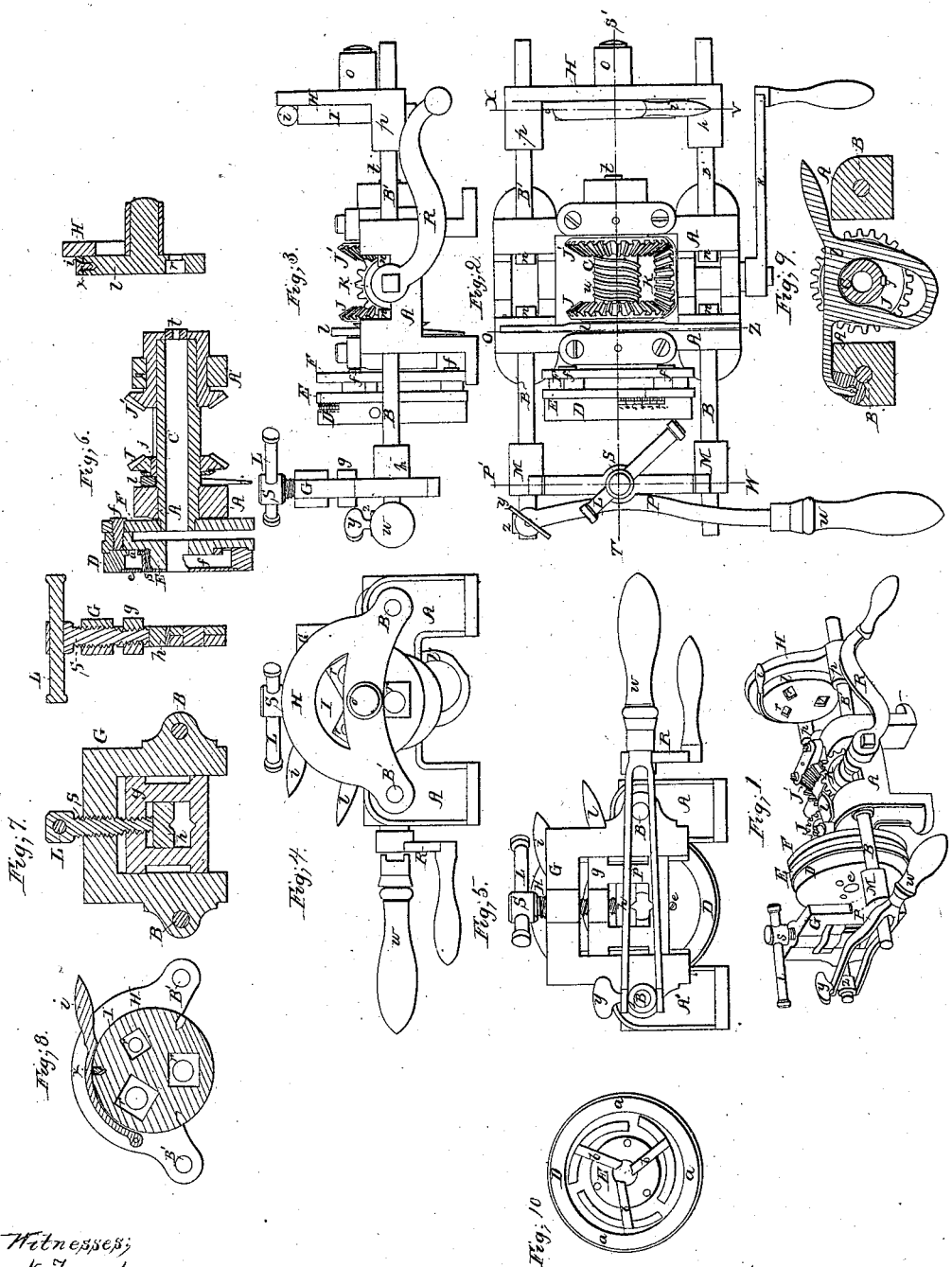

G. BENNETT AND R. DALZELL, OF WADDINGTON, NEW YORK.

MACHINE FOR TAPPING NUTS AND CUTTING SCREWS.

Specification of Letters Patent No. 31,148, dated January 22, 1861.

*To all whom it may concern:*

Be it known that we, GEORGE BENNETT and ROBERT DALZELL, of the town of Waddington, county of St. Lawrence, and State of New York, have invented a new and useful Machine for Cutting Threads in Metallic Bolts and Nuts, which we denominate "Bennett & Dalzell's Excelsior Screw-Cutter"; and we hereby declare that the following is a full, fair, and exact description of the same.

The dies for cutting the threads on bolts which is usually done by a single die and requires to be reversed after the thread is cut to release the bolt are made in three or more pieces which are expanded or contracted at pleasure by eccentric grooves in which the heads of the dies work and by which operation the bolt may be withdrawn after it is cut without reversing the motion of the dies, and the nut may be cut at the same time by the same revolving shaft. The wheel operating the bolt-cutting end of the shaft is put in and out of gear by a wedged shaped pawl. The plate which holds the nut to be cut by the tap revolves, and is held in any desired position to be cut by a pawl and catch as is explained more fully by the annexed drawing forming a part of this specification.

Figure 1 is a perspective view. Fig. 2 is a plan or top view. Fig. 3 is a side elevation. Figs. 4 and 5 are end elevations. Fig. 6 is a longitudinal section through the line T S (Fig. 2.) Fig. 7 is a transverse section of the explanatory bolt holder through the line P W, (Fig. 2.) Fig. 8 is a transverse section of the nut holder through the line X V, (Fig. 2.) Fig. 9 is a transverse section through the line C Z, (Fig. 2.) Fig. 10 is an interior view of the die box with the front plate C removed.

The same letters refer to like parts in the different figures.

A is a cast iron frame with 4 guide rods B B B′ B′ secured to it by the nut $u$.

C is a spindle with the plate F secured to it, and having a longitudinal recess receiving the feather $j$ (as shown in Fig. 9) which is secured to the bevel gear J so as to allow said gear to move back and forward on the same for the purpose of putting it in and out of gear with the pinion K.

D is a circular plate called the index ring made with three eccentric grooves $a\ a\ a$, (Fig. 10,) in which the heads of the dies fit, (as shown in Fig. 6.)

E is a die plate with a projecting boss in the center about one third the diameter of the plate, said boss having three straight angular grooves in which the dies $b\ b\ b$, (Fig. 10,) fit closely but have a free sliding motion.

G is a cast frame with the hubs $m\ m$, bored to slide easily on the guide rods, B B the inner edges of which are V shaped ways on which the frame $g$ slides vertically by means of the screws. The inner edges of $g$ are also V shaped on which the follower $h$ moves forming the upper and $g$ the lower part of the clamps for holding the bolt while the thread is cut. The screw S (as shown in Fig. 7) passes through G and $g$ the lower end resting on $h$, the pitch of the thread G is one half of that at $g$. When the screw S is turned by the lever L it causes the upper part of the clamps $h$ to pass downward at the same velocity that the lower part $g$ passes upward, thus causing the bolt however large or small to retain the same center.

H is a cast frame with the hubs $p\ p$ bored to slide easily on the guide rods B′ B′ and is provided with a quill O.

I is a circular plate revolving on its journal (as shown in Fig. 6) having three or more different sized recesses $r, r, r$, (Figs. 6 and 8,) for holding different sized nuts. $i$ is also a pawl fastened to H by a pin and has a plug X fitting the index holes in I, (as shown in Fig. 8.) The required recess is placed opposite the spindle C, the pawl $i$ is dropped, the plug X holding the plate I securely while the nut is being cut.

J′ is a bevel gear with a long quill cast on the end closely fitted to the end of the spindle C, (Fig. 6,) but it has a free rotating motion and is held in its position by the shoulders of the journal fitting the bearing A, (as shown in Fig. 6.)

K is a bevel pinion matching with the bevel gears J J′.

$t$ is a steel quill inserted in the end of the gear J′ having a square hole in the center to receive the tap for cutting the nuts.

P is a brake attached to the ring Z which is adjustable on the guide rods B by means of the thumb screw $y$.

U is a spiral spring attached to the spindle G and serves to force the gear J out of mesh with the pinion K.

The index ring D, the die plate E, the dies b b b and the plate c being put together as described the whole forms the die box which is firmly secured to the plate F by the screws f, f, f.

The operation of cutting threads on bolts is as follows: The bolt is secured in the clamps g, h, by means of the lever L and the screw s as described. The dies are set to the required size by placing a lever in the hole of the index ring D and turning it back or forward; the size being determined by the relative position of the figures on the index to the mark on the die plate. Motion is then given to the machine by means of the crank R, (or by a belt and pulley.) The bolt is forced between the dies by means of the brake P being applied against the bolt holder. The thread being cut the wedge c is raised when the spiral spring U forces the gear J out of mesh with the pinion K thus stopping the motion of the spindle c and consequently the die box D. The index ring is then turned backward until the bolt is released from the dies. The screw s is also turned backward and it is released from the bolt holder thus saving the time and trouble usually required of reversing the motion to release the bolt.

We claim—

The combination of the expanding die box, the revolving plate or blank holder, and expanding bolt holder, when the same are arranged and constructed as herein shown for the purpose of cutting screws and tapping nuts by the same machine as specified.

Dated Waddington, November 28, 1859.

GEO. BENNETT.
ROBERT DALZELL.

Witnesses:
  JAMES C. BENTER,
  N. TAGGART.